United States Patent
Shih

(10) Patent No.: US 11,055,446 B2
(45) Date of Patent: Jul. 6, 2021

(54) SERVER

(71) Applicants: INVENTEC (PUDONG) TECHNOLOGY CORPORATION, Shanghai (CN); INVENTEC CORPORATION, Taipei (TW)

(72) Inventor: Yi-Chun Shih, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 448 days.

(21) Appl. No.: 16/210,905

(22) Filed: Dec. 5, 2018

(65) Prior Publication Data

US 2020/0159970 A1 May 21, 2020

(30) Foreign Application Priority Data

Nov. 21, 2018 (CN) .......................... 201811388742.0

(51) Int. Cl.
| | |
|---|---|
| *G06F 21/86* | (2013.01) |
| *H05K 5/02* | (2006.01) |
| *H05K 5/03* | (2006.01) |
| *H05K 7/14* | (2006.01) |
| *G06F 11/30* | (2006.01) |

(52) U.S. Cl.
CPC .......... *G06F 21/86* (2013.01); *G06F 11/3044* (2013.01); *H05K 5/0208* (2013.01); *H05K 5/0217* (2013.01); *H05K 5/0239* (2013.01); *H05K 5/03* (2013.01); *H05K 7/1487* (2013.01); *H05K 7/1489* (2013.01); *H05K 7/1495* (2013.01)

(58) Field of Classification Search
CPC ....................................... G06F 1/188
See application file for complete search history.

(56) References Cited

U.S. PATENT DOCUMENTS

| | | | |
|---|---|---|---|
| 6,921,282 B2 * | 7/2005 | Chiou ..................... | G06F 1/188 439/483 |
| 2011/0083825 A1 * | 4/2011 | Merrow ............. | G05D 23/1934 165/80.2 |

* cited by examiner

*Primary Examiner* — Jerry Wu
(74) *Attorney, Agent, or Firm* — Maschoff Brennan

(57) ABSTRACT

The disclosure provides a server including casing, detecting device and cover plate. The casing includes bottom plate, first side plate and second side plate. The first side plate or the second side plate includes an engaging slot. The engaging slot includes fixing part and releasing part that are connected to each other. The edge of first side plate includes hole. The detecting device include switch and controller. The cover plate includes cover portion, first side wall, second side wall, engaging component and protrusion. The cover plate includes fixed position and removable position. When cover plate is located in fixed position, engaging component is located in fixing part, such that cover plate is fixed on casing and protrusion penetrates through hole to push switch. When cover plate is located in removable position, engaging component is located in releasing part, and protrusion is moved away from switch.

8 Claims, 10 Drawing Sheets

SERVER

CROSS-REFERENCE TO RELATED APPLICATIONS

This non-provisional application claims priority under 35 U.S.C. § 119(a) on Patent Application No(s). 201811388742.0 filed in China, on Nov. 21, 2018, the entire contents of which are hereby incorporated by reference.

BACKGROUND OF THE INVENTION

Technical Field of the Invention

The invention relates to a server, more particularly to a server including a detector for detecting the movement of a cover plate.

Description of the Related Art

In general, a detector is disposed on a server to detect positions of the top cover so as to ensure that the user can be immediately informed as the top cover is moved. The top cover should be moved away from the bottom plate along a direction perpendicular to the bottom plate to be detached from the server chassis. Thus, conventional detector detects positions of the top cover based on the displacement of the top cover along the direction perpendicular to the bottom plate.

However, the cover plate should be moved along a direction parallel to the bottom plate to be released from the engagement of side plates before being detached from the server chassis along the direction perpendicular to the bottom plate. In addition, when the top cover is moved along the direction parallel to the bottom plate to be released from the engagement of side plates, the top cover is opened and exposes some of the electronic components in the chassis, and the top cover can further be detached from the server chassis along the direction perpendicular to the bottom plate easily. Thus, conventional detector that detects positions of the top cover based on the displacement of the top cover along the direction perpendicular to the bottom plate is unable to detect the displacement of the top cover along the direction parallel to the bottom plate. As a result, the conventional detector cannot immediately inform the user as the top cover is moved.

SUMMARY OF THE INVENTION

One embodiment of the disclosure provides a server including a casing, a detecting device and a cover plate. The casing includes a bottom plate, a first side plate and a second side plate. The first side plate and the second side plate are located on two opposite sides of the bottom plate to form an accommodating space therebetween. The first side plate or the second side plate includes an engaging slot. The engaging slot includes a fixing part and a releasing part that are connected to each other. The releasing part is located on an edge of the first side plate or the second side plate away from the bottom plate. The fixing part is spaced apart from the edge. The edge of the first side plate includes a hole. The detecting device includes a switch and a controller. The controller is fixed to the first side plate and is located in the accommodating space. The switch is located on the first side plate. The cover plate includes a cover portion, a first side wall, a second side wall, an engaging component and a protrusion. The first side wall and the second side wall are located on two opposite sides of the cover portion. The engaging component protrudes from the first side wall or the second side wall. The protrusion protrudes from the first side wall. The engaging component and the protrusion are located between the first side wall and the second side wall. The cover portion is located on a side of the first side plate away from the bottom plate and a side of the second side plate is away from the bottom plate. The cover plate includes a fixed position and a removable position. When the cover plate is in the fixed position, the engaging component is located in the fixing part so that the cover plate is fixed to the casing, and the protrusion penetrates through the hole of the first side plate and pushes the switch. When the cover plate is in the removable position, the engaging component is located in the releasing part and the protrusion is moved away from the switch.

Another embodiment of the disclosure provides a server including a casing, a detecting device and a cover plate. The casing includes a bottom plate, a first side plate and a second side plate. The first side plate and the second side plate are located on two opposite sides of the bottom plate to form an accommodating space therebetween. The first side plate or the second side plate includes an engaging slot. The engaging slot includes a fixing part and a releasing part that are connected to each other. The releasing part is located on an edge of the first side plate or the second side plate away from the bottom plate. The fixing part is spaced apart from the edge. The edge of the first side plate includes a hole. The detecting device includes a switch and a controller. The controller is fixed to the second side plate and is located in the accommodating space. The switch is located on the second side plate. The cover plate includes a cover portion, a first side wall, a second side wall, an engaging component and a protrusion. The first side wall and the second side wall are located on two opposite sides of the cover portion. The engaging component protrudes from the first side wall or the second side wall. The protrusion protrudes from the first side wall. The engaging component and the protrusion are located between the first side wall and the second side wall. The cover portion is located on a side of the first side plate away from the bottom plate and a side of the second side plate is away from the bottom plate. The cover plate includes a fixed position and a removable position. When the cover plate is in the fixed position, the engaging component is located in the fixing part so that the cover plate is fixed to the casing, and the protrusion penetrates through the hole of the first side plate and pushes the switch. When the cover plate is in the removable position, the engaging component is located in the releasing part and the protrusion is moved away from the switch.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
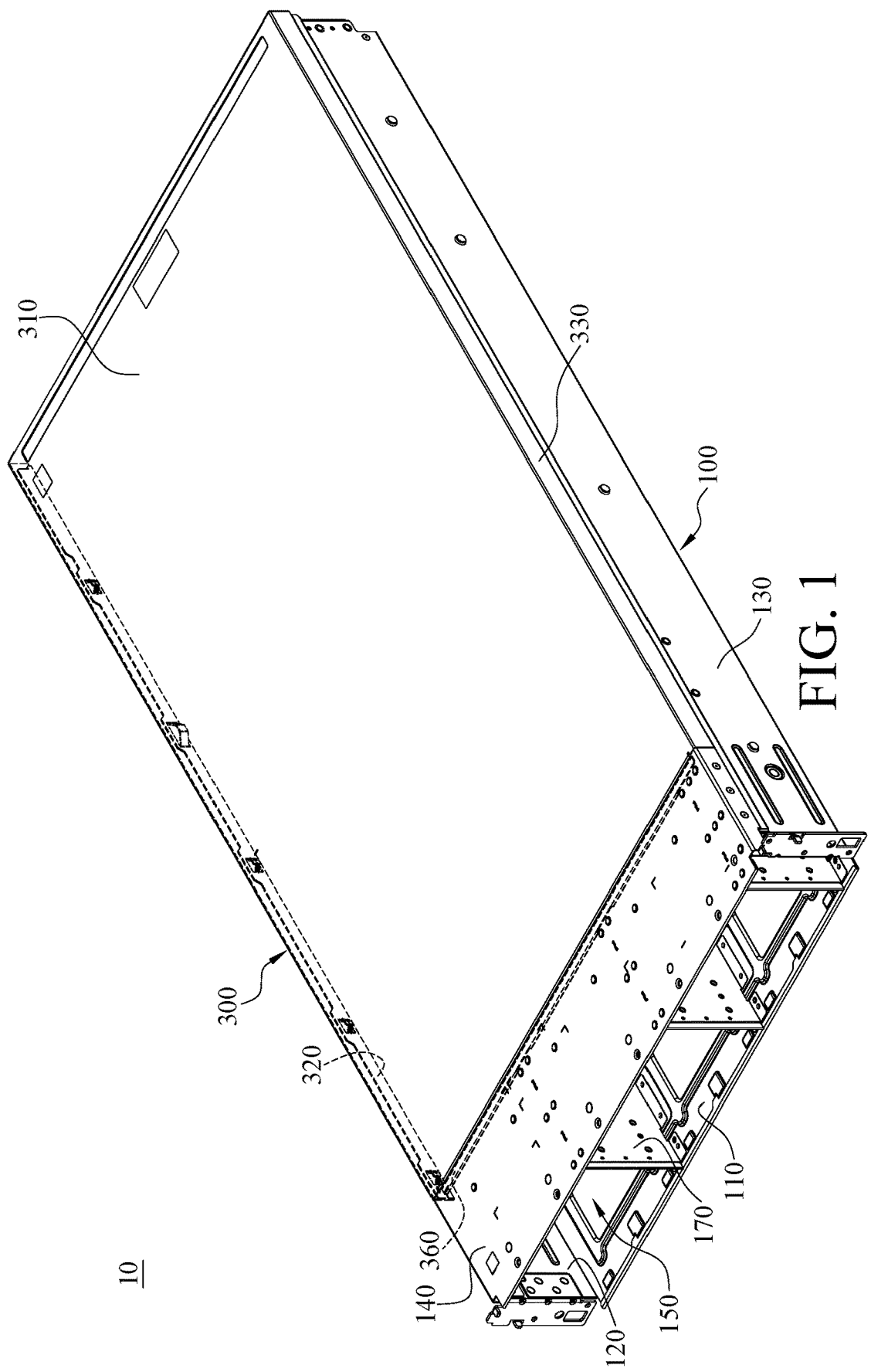
FIG. 1 is a perspective view of a server according to one embodiment of the disclosure.
Figure 2:
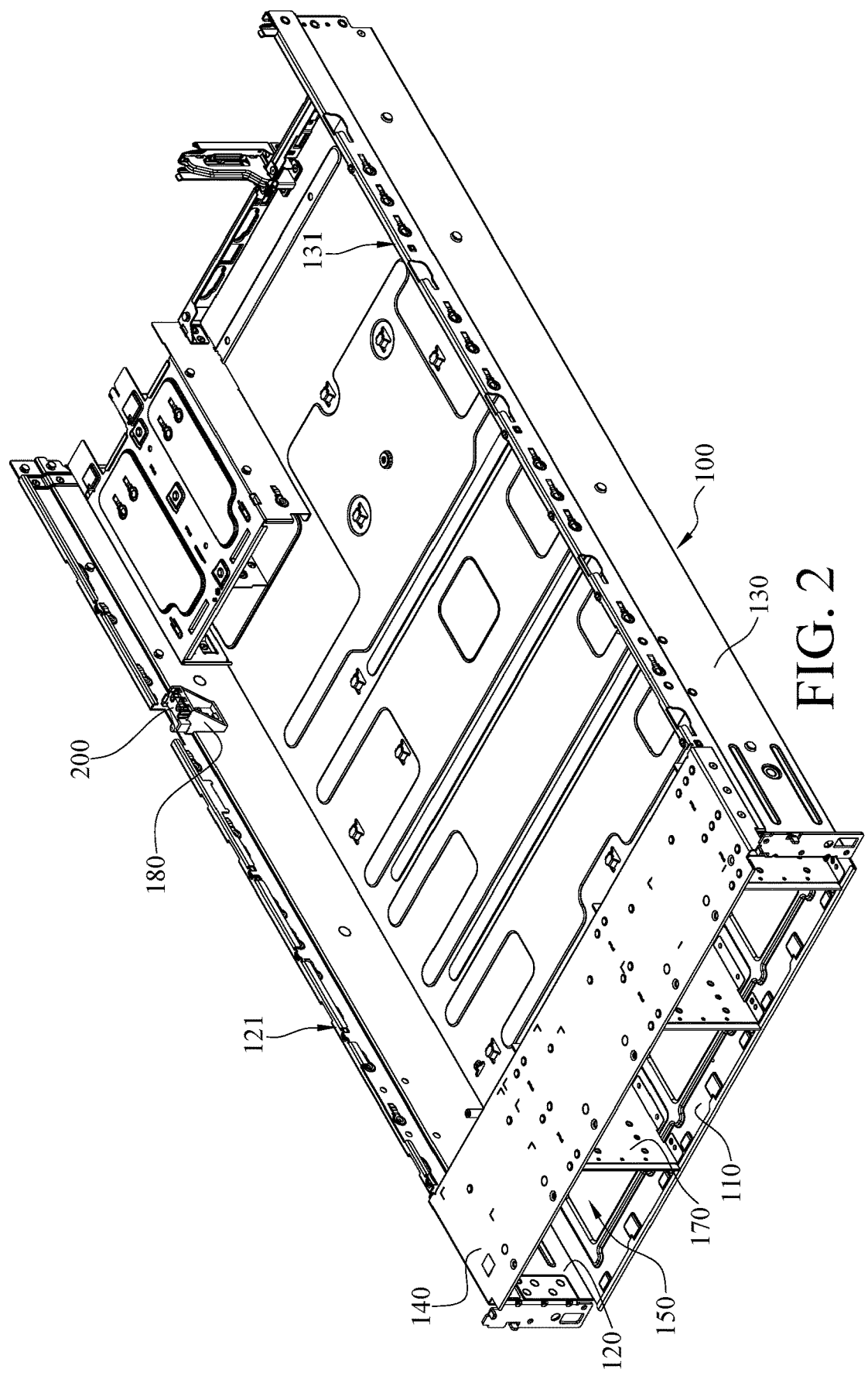
FIG. 2 is a perspective view of the server in FIG. 1 when a cover plate is removed.
Figure 3:
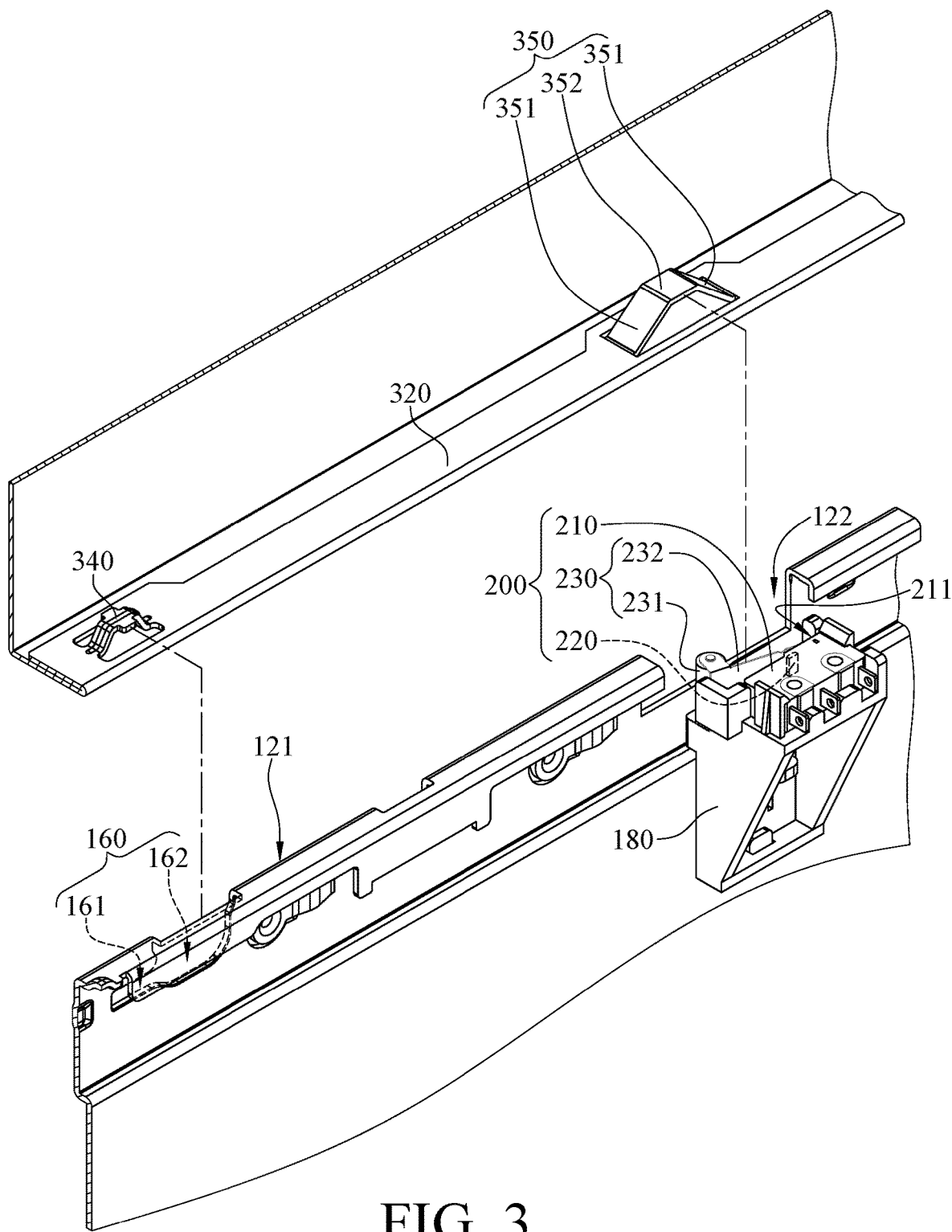
FIG. 3 is a partial enlarged exploded view of the server in FIG. 1.

Please refer to FIG. 1 to FIG. 3. FIG. 1 is a perspective view of a server according to one embodiment of the disclosure. FIG. 2 is a perspective view of the server in FIG. 1 when a cover plate is removed. FIG. 3 is a partial enlarged exploded view of the server in FIG. 1.

This embodiment provides a server 10 including a casing 100, a detecting device 200 and a cover plate 300.

The casing 100 includes a bottom plate 110, a first side plate 120, a second side plate 130 and a connecting plate 140. The first side plate 120 and the second side plate 130 face each other and are respectively located on two opposite sides of the bottom plate 110, such that the first side plate 120, the second side plate 130 and the bottom plate 110 form an accommodating space 150 therebetween. The connecting plate 140 is fixed to a side of the first side plate 120 away from the bottom plate 110 and a side of the second side plate 130 away from the bottom plate 110. In other embodiments, the casing may include no connecting plate.

The first side plate 120 and the second side plate 130 each include a plurality of engaging slots 160. In detail, the engaging slots 160 each include a fixing part 161 and a releasing part 162 that are connected to each other. The releasing parts 162 are respectively located on an edge 121 of the first side plate 120 and an edge 131 of the second side plate 130 that are located away from the bottom plate 110. The fixing parts 161 are respectively spaced apart from the edges 121 and 131 by the same distance. In each fixing part 161, two opposite sides of the fixing part 161 is spaced apart from the corresponding edge 121 or 131 by the same distance, and the fixing part 161 extends in a direction parallel to the bottom plate 110. In addition, the first side plate 120 has a hole 122 formed on the edge 121. However, the disclosure is not limited by the configuration of the fixing part 161; in other embodiments, two opposite sides of each of the fixing parts may be respectively spaced apart from the corresponding edge by different distances; in another embodiment, the fixing part may extend in a direction at an acute angle to the bottom plate.

In addition, the quantity of the engaging slots 160 on the first side plate 120 and the second side plate 130 is not restricted. In other embodiments, the first side plate and the second side plate may each have only one engaging slot. Alternatively, in still another embodiment, only one of the first side plate and the second side plate have one engaging slot.

In this embodiment, the casing 100 may further include a plurality of partitions 170. The partitions 170 are located between the bottom plate 110 and the connecting plate 140. These partitions 170 divide the space between the bottom plate 110 and the connecting plate 140 into a plurality of sub-spaces (not labeled) for accommodating fans (not shown) or other electronic components (not shown). Note that the partitions 170 are optional.

In this embodiment, the casing 100 may further include a mounting component 180. The mounting component 180 is fixed on the first side plate 120 and is located between the first side plate 120 and the second side plate 130. In this embodiment, the mounting component 180 and the first side plate 120 are made of the same material, but the disclosure is not limited thereto; in other embodiments, the mounting component and the first side plate may be made of different materials.

The detecting device 200 includes a controller 210, a switch 220 and a trigger 230. The switch 220 and the trigger 230 protrude from the same side of the controller 210, and the switch 220 is located on, for example, a first surface 211 of the controller 210 facing the first side plate 120. The trigger 230 is movably disposed on the controller 210. The controller 210 is fixed to a side of the mounting component 180 away from the bottom plate 110. That is, the controller 210 is fixed to the first side plate 120 via the mounting component 180. Additionally, the controller 210 is located inside the accommodating space 150. However, the mounting component 180 and trigger 230 are optional; in other embodiments, the casing may include no mounting component and no trigger.

The switch 220 may be configured to be a button, and the switch 220 is not limited to be a mechanical button that utilizes a spring to switch between a pressed position and a non-pressed position. In another embodiment, the switch may be an electronic button that can switch states by touching. In this embodiment, the trigger 230 extends toward the first side plate 120 from the controller 210 and is exposed from the hole 122. In detail, the trigger 230 includes a roller 231 and a connecting rod 232. The roller 231 is pivoted to the connecting rod 232. The connecting rod 232 and the switch 220 protrude from the same side of the controller 210, and the connecting rod 232 extends toward the first side plate 120 from a side of the controller 210 so that the connecting rod 232 can be moved with respect to the controller 210 to push the switch 220.

Note that the disclosure is not limited to the positions of the switch 220 and the trigger 230; in other embodiments, the switch and the trigger may be located on adjacent sides of the controller. In detail, as the switch and the trigger are located on adjacent two sides of the controller, the trigger should extend to a side of the controller with the switch, such that the trigger can be moved with respect to the controller to push the switch. Further, in still other embodiments, the switch may be located on a surface of the controller that is adjacent to the first surface. Moreover, in still other embodiments, the switch may be disposed directly on the first side plate, and in the embodiments where the controller is disposed on the second side plate, the switch may be directly located on the second side plate.

In this embodiment, the controller 210, the roller 231 and the connecting rod 232 are all exposed from the hole 122, but the disclosure is not limited thereto. In other embodiments, the controller may not be exposed from the hole, and only the trigger is exposed from the hole.

The cover plate 300 includes a cover portion 310, a first side wall 320, a second side wall 330, a plurality of engaging components 340 and a protrusion 350. The first side wall 320 and the second side wall 330 face each other and are respectively located at two opposite sides of the cover portion 310. The engaging components 340 respectively protrude from the first side wall 320 and the second side wall 330. The protrusion 350 includes two guide parts 351 and a push part 352. Two opposite ends of the push part 352 are respectively connected to the two guide parts 351. The two guide parts 351 protrude from the first side wall 320. The two guide parts 351 and the push part 352 may be flat. The engaging components 340 and the protrusion 350 are located between the first side wall 320 and the second side wall 330. In addition, the protrusion 350 and the first side wall 320 are made of the same material, but the disclosure is not limited thereto; in other embodiments, the protrusion, the first side wall, the cover portion and the second side wall may be made of the same material. In still other embodiments, the protrusion and the first side wall may be made of different materials.

The cover portion 310 and the connecting plate 140 are arranged side by side, and the cover portion 310 is located on sides of the first side plate 120 and the second side plate 130 that are away from the bottom plate 110. Additionally, the first side plate 120 and the second side plate 130 are located between the first side wall 320 and the second side wall 330. Further, the cover plate 300 may further include a protruding plate 360 protruding from a side of the cover portion 310 close to the connecting plate 140, but the disclosure is not limited thereto; in other embodiments, the cover plate may also include no protruding plate.

Furthermore, the disclosure is not limited to the quantity of the engaging components 340; in other embodiments, the quantity of the engaging components may be varied with the quantity of the engaging slots. That is, in other embodiments, the first side wall and the second side wall may each include one engaging component, and they are arranged along horizontal direction or diagonal direction in a top view. Alternatively, in still other embodiments, only the first side wall or the second side wall may include one engaging component, or only the first side wall includes two engaging components and the second side wall includes no engaging component. Additionally, the two engaging components on the first side wall are arranged vertically in a top view.

Figure 4:
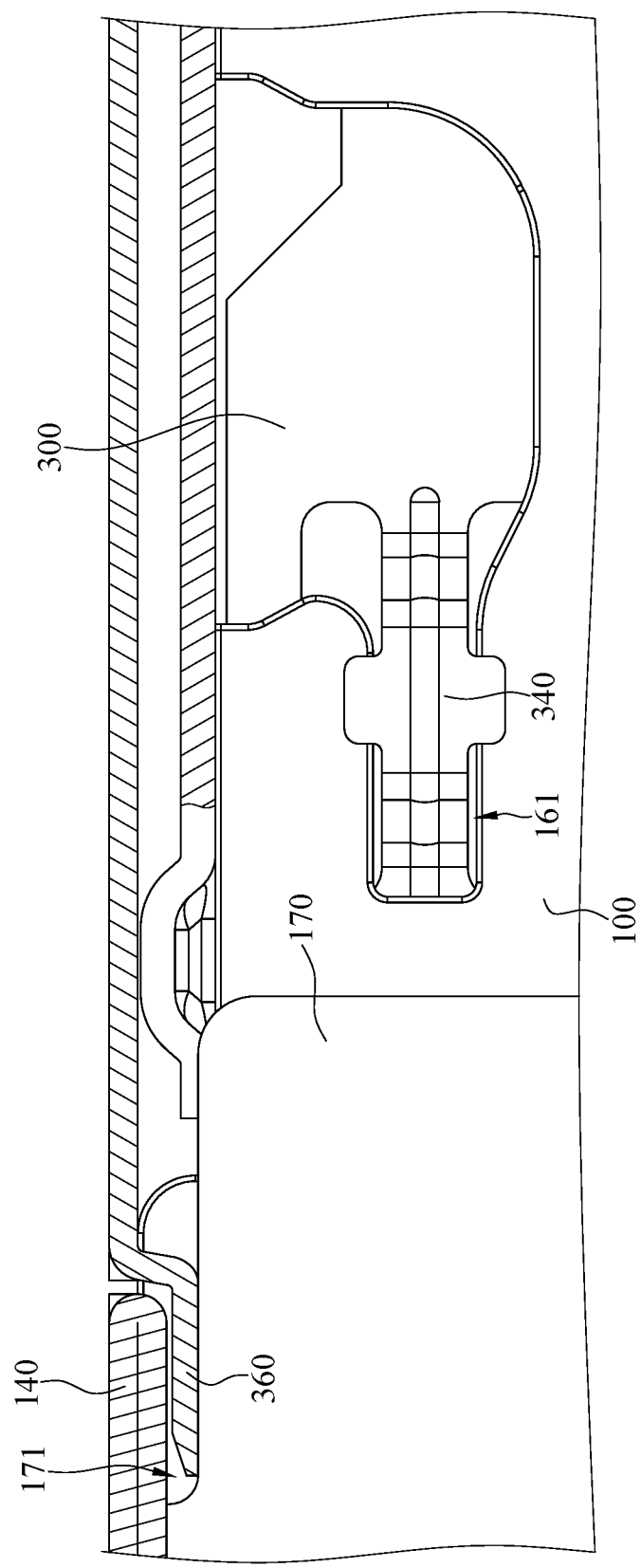
FIG. 4 is a partial enlarged cross-sectional view of the server in FIG. 1.
Figure 5:
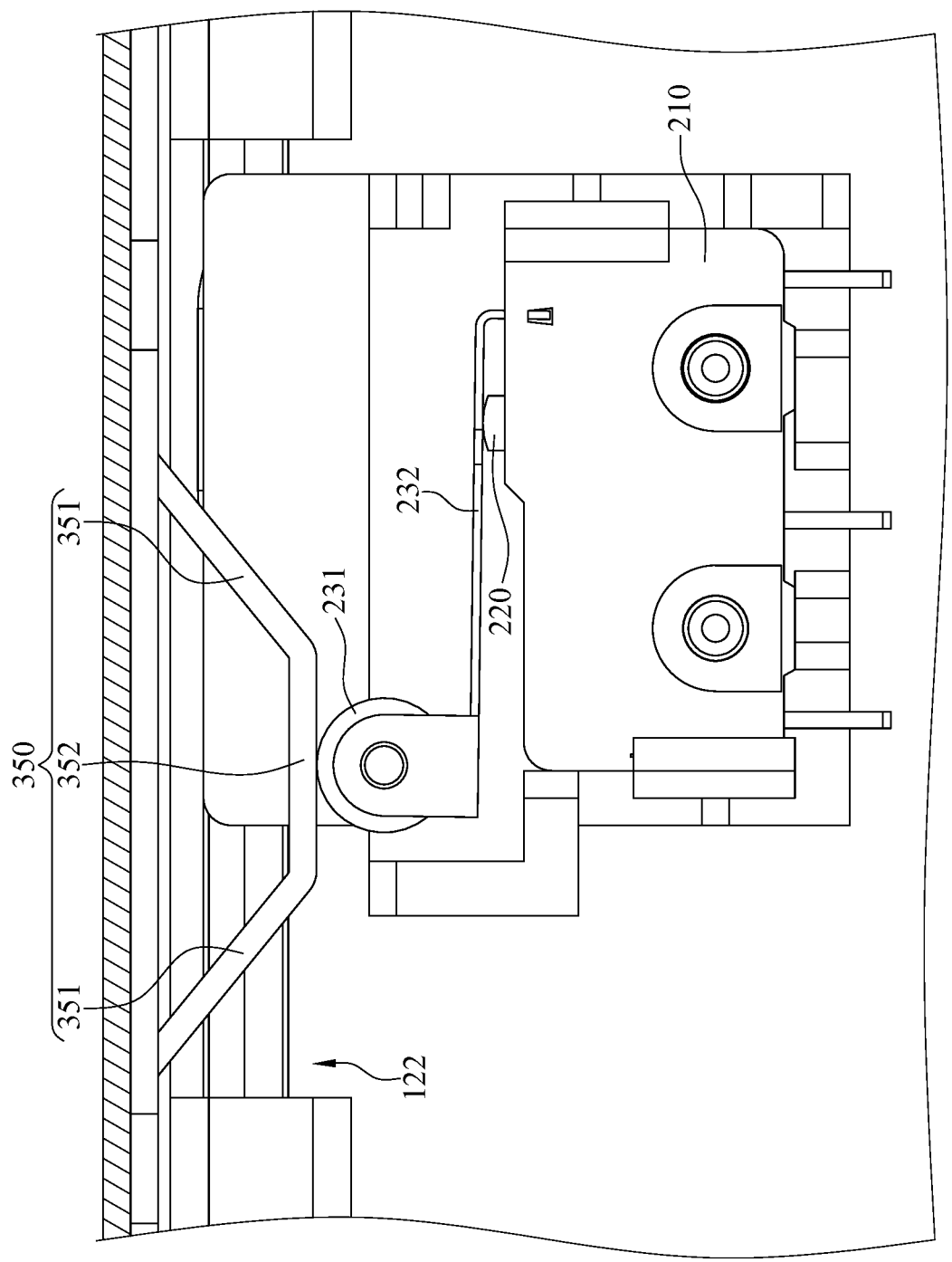
FIG. 5 is another partial enlarged cross-sectional view of the server in FIG. 1.

Next, the operation of the casing 100 with respect to the cover plate 300 is illustrated. Please refer to FIG. 1, FIG. 4 and FIG. 5. FIG. 4 is a partial enlarged cross-sectional view of the server in FIG. 1. FIG. 5 is another partial enlarged cross-sectional view of the server in FIG. 1.

To protect the electronic components (not shown) accommodated in the accommodating space 150, the cover plate 300 can be in a fixed position to cover the accommodating space 150. When the cover plate 300 is in the fixed position, the engaging components 340 are respectively located in the fixing parts 161 (as shown in FIG. 4), thereby preventing the cover plate 300 from moving in a direction perpendicular to the bottom plate 310. Therefore, the cover plate 300 is fixed to the casing 100. At this moment, the protruding plate 360 is located on a side of the connecting plate 140 facing the bottom plate 110 (as shown in FIG. 4). Further, the protruding plate 360 is located in a space 171 which is formed between the connecting plate 140 and the partitions 170, such that the cover plate 300 is firmly fixed to the casing 100. In addition, the push part 352 of the protrusion 350 penetrates through the hole 122 and pushes the switch 220 (as shown in FIG. 5). In detail, the push part 352 pushes the roller 231 so as to force the side of the connecting rod 232 pivoted to the roller 231 to move toward the controller 210, such that the connecting rod 232 pushes the switch 220 to cause the controller 210 to be in a standby state.

Figure 6:
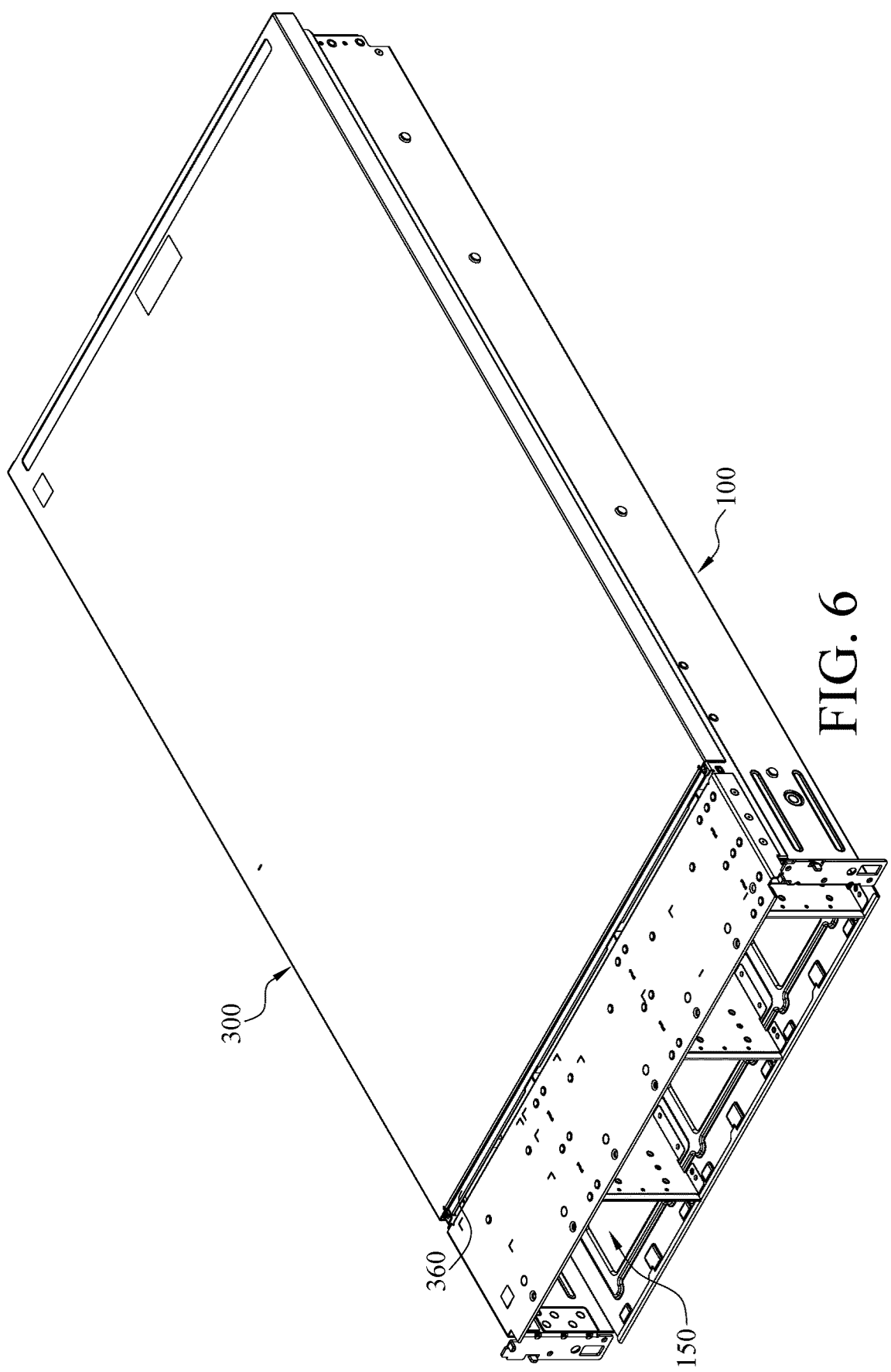
FIG. 6 is a perspective view of the server in FIG. 1 when the cover plate of the server is located in a removable position.
Figure 7:
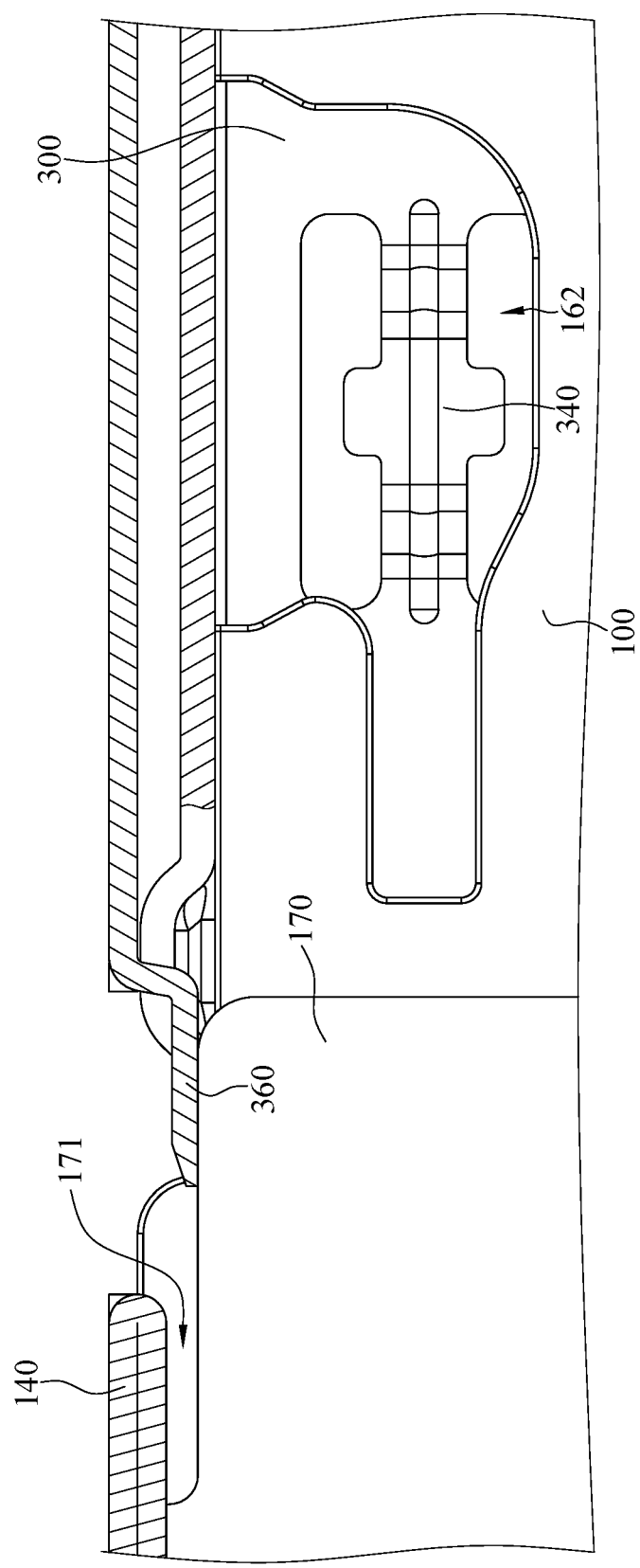
FIG. 7 is a partial enlarged cross-sectional view of the server in FIG. 6.
Figure 8:
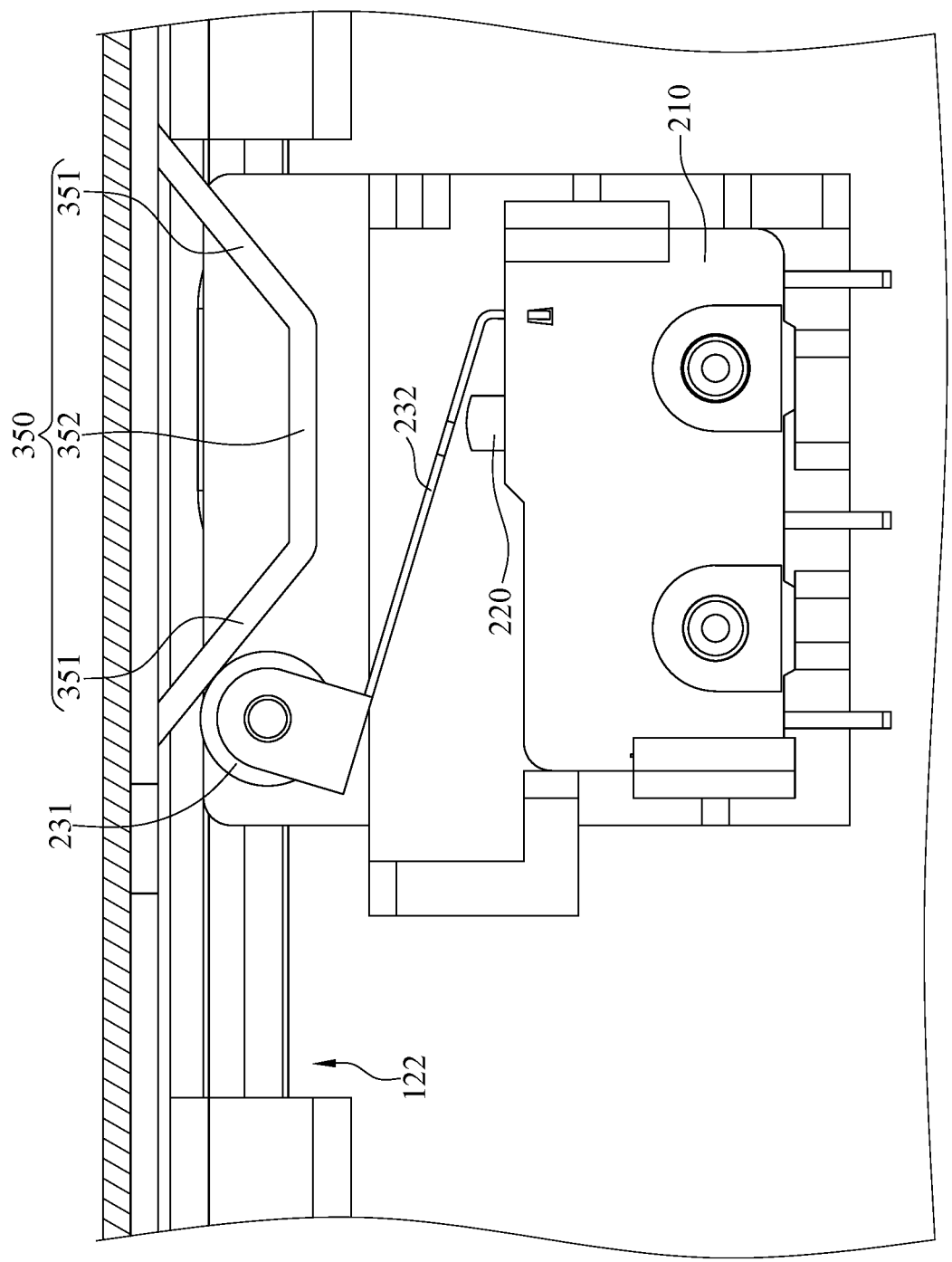
FIG. 8 is another partial enlarged cross-sectional view of the server in FIG. 6.

Next, please refer to FIG. 6 to FIG. 8. FIG. 6 is a perspective view of the server in FIG. 1 when the cover plate of the server is located in a removable position. FIG. 7 is a partial enlarged cross-sectional view of the server in FIG. 6. FIG. 8 is another partial enlarged cross-sectional view of the server in FIG. 6.

When the cover plate 300 is moved from the fixed position to a removable position, the engaging components 340 are respectively moved from the fixing parts 161 to the releasing parts 162 (as shown in FIG. 7), such that the protruding plate 360 is removed from the space 171 and exposed to outside, and the roller 231 is located on one of the guide parts 351. As such, the side of the connecting rod 232 pivoted to the roller 231 is moved away from the controller 210, such that the connecting rod 232 is moved away from the switch 220 (as shown in FIG. 8) to cause the controller 210 to be in an activated state. Therefore, the user will be informed by the controller 210 as the cover plate 300 is in the removable position but not yet detached from the casing 100. That is, the user can be immediately informed as the cover plate 300 is switched to an openable state.

Figure 9:
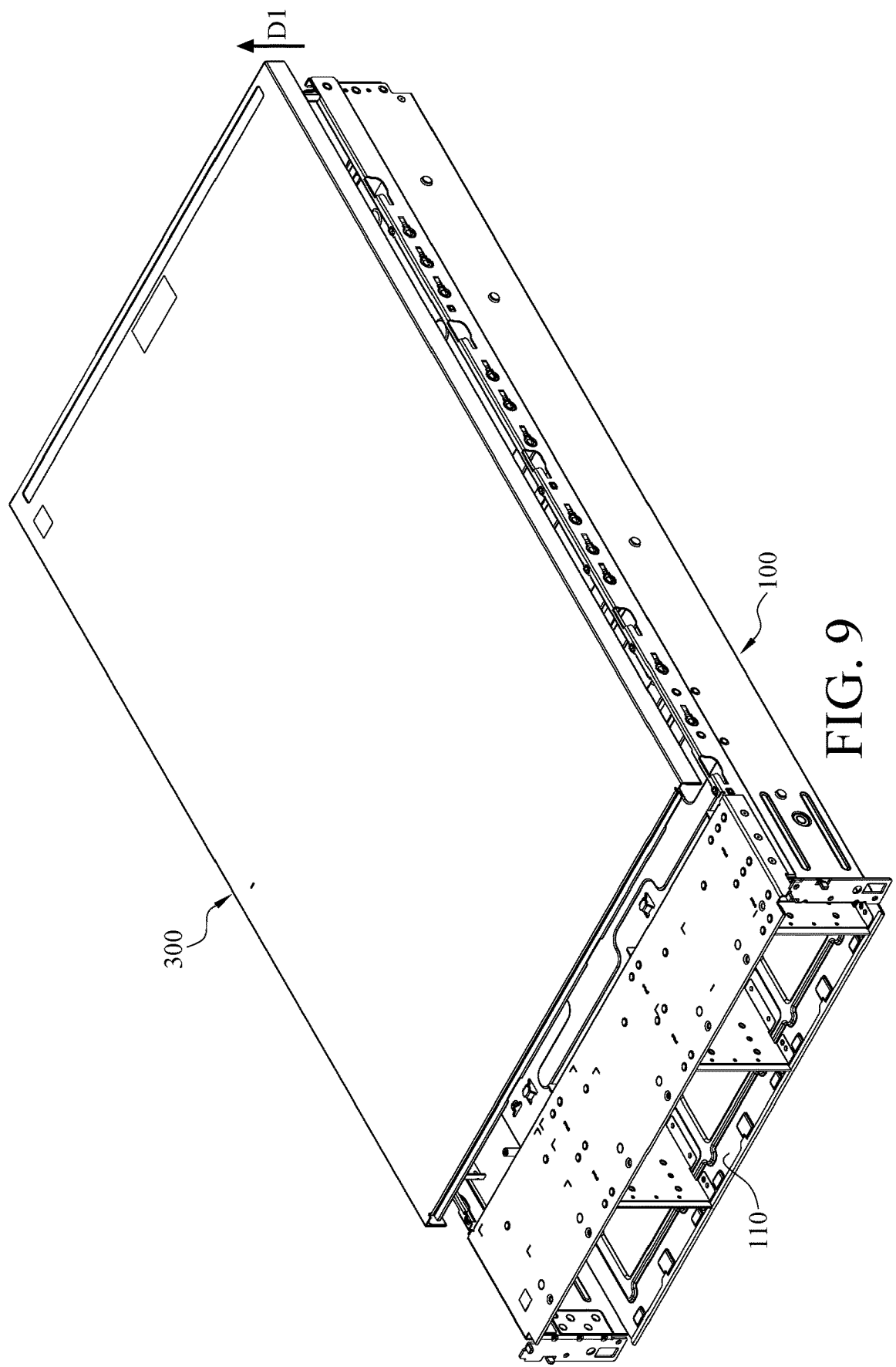
FIG. 9 is a perspective view of the server in FIG. 1 when the cover plate of the server is detached from a casing.
Figure 10:
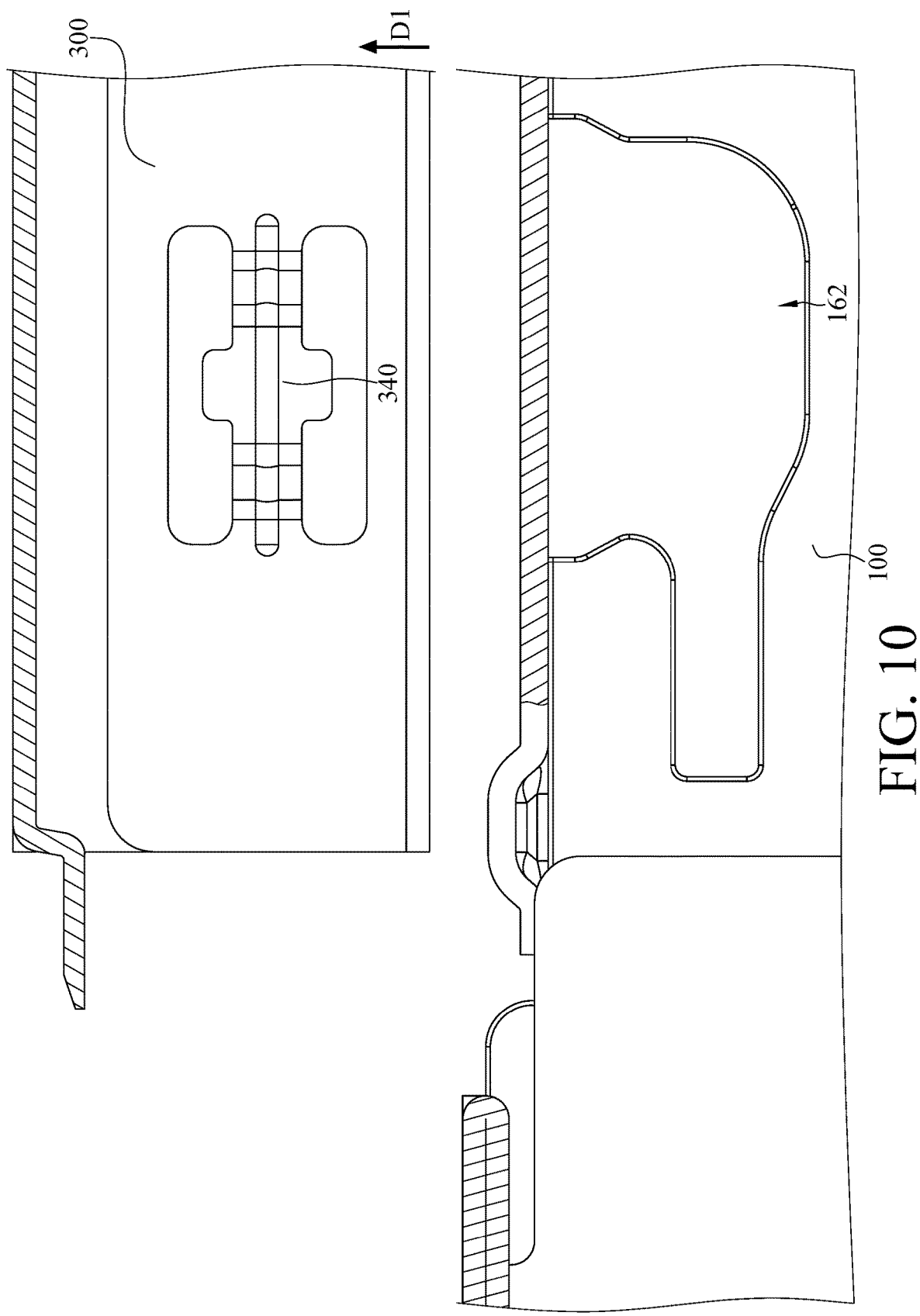
FIG. 10 is a partial enlarged cross-sectional view of the server in FIG. 9.

Please refer to FIG. 9 and FIG. 10. FIG. 9 is a perspective view of the server in FIG. 1 when the cover plate of the server is detached from a casing. FIG. 10 is a partial enlarged cross-sectional view of the server in FIG. 9.

As the cover plate 300 is in the removable position, the cover plate 300 is allowed to be moved away from the bottom plate 110 along a removal direction D1, such that the engaging components 340 are respectively detached from the casing 100 from the releasing parts 162.

According to the server discussed above, since the protrusion of the cover plate can push the switch as the cover plate is located in the fixed position, and be moved away from the switch as the cover plate is located in the removable position, the cover plate can be detected by the detecting device when it is moved from the fixed position to the removable position but not yet being detached from the casing. In this way, the detecting device can inform the user that the cover plate is opened immediately.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A server comprising: a casing, comprising a bottom plate, a first side plate and a second side plate, the first side plate and the second side plate located on two opposite sides of the bottom plate to form an accommodating space therebetween, the first side plate or the second side plate comprising an engaging slot, the engaging slot comprising a fixing part and a releasing part that are connected to each other, the releasing part located on an edge of the first side plate or the second side plate away from the bottom plate, the fixing part spaced apart from the edge, and the edge of the first side plate comprising a hole; a detecting device, comprising a switch and a controller, the controller fixed to the first side plate and located in the accommodating space, and the switch located on the first side plate; and a cover plate, comprising a cover portion, a first side wall, a second side wall, an engaging component and a protrusion, the first side wall and the second side wall located on two opposite sides of the cover portion, the engaging component protruding from the first side wall or the second side wall, the protrusion protruding from the first side wall, the engaging component and the protrusion located between the first side wall and the second side wall, and the cover portion located on a side of the first side plate away from the bottom plate and a side of the second side plate away from the bottom plate; wherein, the cover plate comprises a fixed position and a removable position; when the cover plate is in the fixed position, the engaging component is located in the fixing part so that the cover plate is fixed to the casing, and the protrusion penetrates through the hole of the first side plate and pushes the switch; when the cover plate is in the removable position, the engaging component is located in the releasing part and the protrusion is moved away from the switch; wherein the detecting device further comprises a trigger, the trigger is movably disposed on the controller, the trigger comprises a roller and a connecting rod, the roller is rotatably disposed on the connecting rod; when the cover plate is in the fixed position, the protrusion pushes the roller so that the connecting rod pushes the switch.

2. The server according to claim 1, the trigger extends toward the first side plate, the trigger and the switch are located on a same side of the controller; when the cover plate is in the fixed position, the protrusion pushes the switch via the trigger.

3. The server according to claim 2, wherein the trigger and the controller are exposed from the hole of the first side plate.

4. The server according to claim 1, wherein the switch is located on a surface of the controller facing the first side plate.

5. The server according to claim 1, wherein the protrusion comprises two guide parts and a push part, two opposite sides of the push part are respectively connected to the two guide parts, the two guide parts protrude from the first side wall; when the cover plate is in the fixed position, the push part pushes the switch.

6. The server according to claim 1, wherein the casing further comprises a connecting plate fixed to a side of the first side plate away from the bottom plate and a side of the second side plate away from the bottom plate, the connecting plate is arranged side by side with the cover portion of the cover plate, the cover plate further comprises a protruding plate, the protruding plate protrudes from a side of the cover portion close to the connecting plate; when the cover plate is in the fixed position, the protruding plate is located on a side of the connecting plate facing the bottom plate.

7. The server according to claim 1, wherein the casing further comprises a mounting component fixed to the first side plate and located in the accommodating space, and the controller is fixed to a side of the mounting component away from the bottom plate.

8. A server, comprising: a casing, comprising a bottom plate, a first side plate and a second side plate, the first side plate and the second side plate located on two opposite sides of the bottom plate to form an accommodating space therebetween, the first side plate or the second side plate comprising an engaging slot, the engaging slot comprising a fixing part and a releasing part that are connected to each other, the releasing part located on an edge of the first side plate or the second side plate away from the bottom plate, the fixing part spaced apart from the edge, and the edge of the first side plate comprising a hole; a detecting device, comprising a switch and a controller, the controller fixed to the second side plate and located in the accommodating space, and the switch located on the second side plate; and a cover plate, comprising a cover portion, a first side wall, a second side wall, an engaging component and a protrusion, the first side wall and the second side wall located on two opposite sides of the cover portion, the engaging component protruding from the first side wall or the second side wall, the protrusion protruding from the first side wall, the engaging component and the protrusion located between the first side wall and the second side wall, and the cover portion located on a side of the first side plate away from the bottom plate and a side of the second side plate away from the bottom plate; wherein, the cover plate comprises a fixed position and a removable position; when the cover plate is in the fixed position, the engaging component is located in the fixing part so that the cover plate is fixed to the casing, and the protrusion penetrates through the hole of the first side plate and pushes the switch; when the cover plate is in the removable position, the engaging component is located in the releasing part and the protrusion is moved away from the switch; wherein the detecting device further comprises a trigger, the trigger is movably disposed on the controller, the trigger comprises a roller and a connecting rod, the roller is rotatably disposed on the connecting rod; when the cover plate is in the fixed position, the protrusion pushes the roller so that the connecting rod pushes the switch.

* * * * *